United States Patent [19]

Nagata et al.

[11] Patent Number: 4,643,549
[45] Date of Patent: Feb. 17, 1987

[54] DATA IMPRINTING DEVICE FOR A CAMERA

[75] Inventors: Toru Nagata; Chikara Aoshima, both of Kanagawa; Hiroshi Maeno; Hideo Tamamura, both of Tokyo, all of Japan

[73] Assignee: Canon Kabushiki Kaisha, Tokyo, Japan

[21] Appl. No.: 704,787

[22] Filed: Feb. 25, 1985

[30] Foreign Application Priority Data

Feb. 25, 1984 [JP] Japan .................................. 59-33343
Feb. 25, 1984 [JP] Japan .................................. 59-33346

[51] Int. Cl.⁴ ............................................ G03B 39/00
[52] U.S. Cl. ..................................... 354/64; 354/105; 354/289.1; 354/475
[58] Field of Search ............... 354/474, 475, 105, 106, 354/107, 109, 289.1, 64

[56] References Cited

U.S. PATENT DOCUMENTS

| 4,330,186 | 5/1982 | Hattori | 354/106 |
| 4,470,680 | 9/1984 | Inagaki | 354/64 |
| 4,498,751 | 2/1985 | Goto | 354/289.1 |

Primary Examiner—Russell E. Adams
Attorney, Agent, or Firm—Toren, McGeady and Goldberg

[57] ABSTRACT

A data imprinting device having an input lock switch responsive to external pressure for rendering unable the input of imprinting data by an input switch, wherein the input switch and the input lock switch controls the operation of a lamp for illuminating the imprinting data in such a way that the illumination differs between when the input is unable and when the data has been input.

6 Claims, 2 Drawing Figures

DATA IMPRINTING DEVICE FOR A CAMERA

BACKGROUND OF THE INVENTION

1. Field of the Invention

This invention relates to a data imprinting device for a camera capable of underwater photography.

2. Description of the Prior Art

A majority of the recently developed cameras have the data imprinting device carried on the back cover. The data from an electronic timer circuit are displayed by liquid crystal light shutter display elements, and, when the display is illuminated from the back, are imprinted on the photographic film. To correct or select these data, or to set the film sensitivity, there are actuators which are usually in most cases constructed in the form of push button switches. When in application of this kind of data imprinting device to cameras capable of underwater photography, measures must be taken to prevent erroneous inputs from occurring when the water pressure becomes so high as to press the push buttons. According to the prior art, a water depth meter is incorporated in the camera and renders the push button switches unable to set or adjust the display when the water depth is deeper than a certain value, as disclosed in Japanese Laid-Open Patent Application No. SHO 58-173725. Once the input-locking is effected, all actuating operations are rejected. This can be known by the user only when he sees that the data readout in the display window is not responsive to the actuation of the buttons. Since under water at so deep a depth as to lock the input data, however, the available light is very low, it is difficult to make sure the input data are not locked. If the user is unaware of the fact that the input data have been locked, incorrect data will be imprinted in a continuous series of frames of the film.

SUMMARY OF THE INVENTION

An object of the present invention is to eliminate the above-described drawback and to provide a data imprinting device for a camera which allows for the photographer to ascertain whether or not the data inputs are locked, and further to know what data were imprinted.

Other objects of the invention will become apparent from the following description of an embodiment thereof.

DETAILED DESCRIPTION OF THE PREFERRED EMBODIMENT

Figure 1:
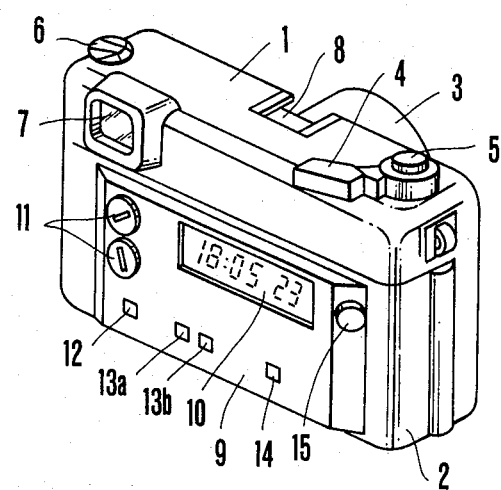
FIG. 1 is a perspective view of an embodiment of a data imprinting device according to the present invention applied to a camera capable of underwater photography.

The present invention will next be described in connection with an embodiment thereof by reference to the drawings. In FIG. 1, a camera body 1 has a back cover 2 in which a date data imprinting device is incorporated. 3 is a lens barrel. A winding lever 4, a release button 5 and a rewind crank 6 are positioned on the upper panel of the camera body 1. 7 is an eye-piece of the finder. 8 is a shoe for an underwater finder or the like. These operating members and the back cover 2 are watertightly assembled to the camera body 1, as is well known in the art. The watertightening techniques are also known. The date data imprinting device is housed in a casing 9 molded as a unit with the back cover 2. On the casing 9 there are shown a liquid crystal panel 10 for reading out the imprinting data, battery chamber covers 11 for the electrical power source of the imprinting device 9, a mode selector button 12 for watch functions, data setting or adjusting buttons 13a and 13b, a film speed setting button 14, and an input lock button 15. The pressure necessary to operate the button 15 is lower than that necessary to operate each of the buttons 12 to 14. For this purpose, the area of the button 15 is made larger than that of each of the buttons 12 to 14, or the bias force for the button 15 is made weaker than for each of the buttons 12 to 14. Therefore, as the pressure applied to the camera (from either water or the air) increases, the input lock button 12 is first depressed, and, after a furthermore increase of the pressure, the buttons 12 to 14 are depressed at nearly the same time.

Figure 2:
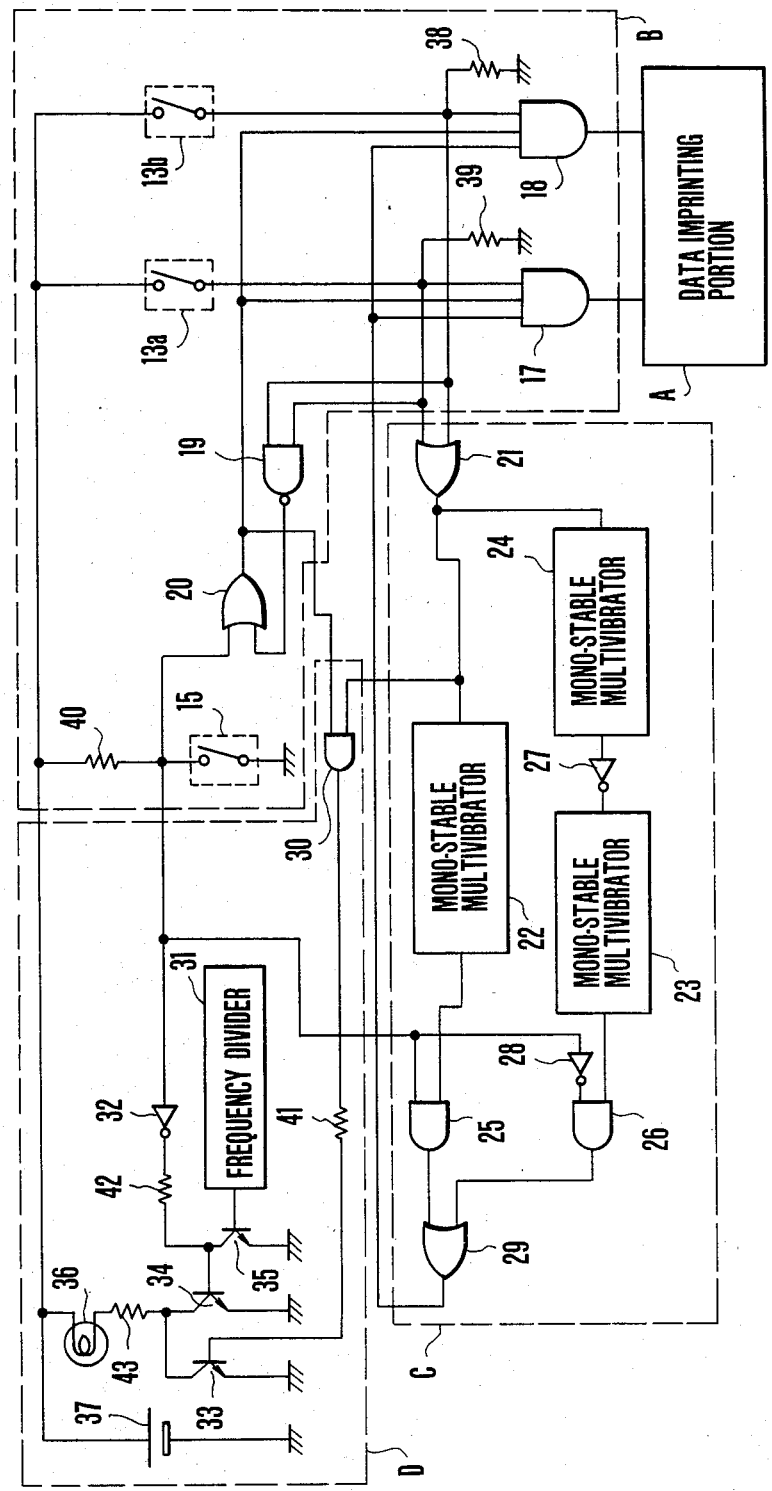
FIG. 2 is an electrical circuit diagram of the device of FIG. 1.

FIG. 2 illustrates the circuitry of the data imprinting device of FIG. 1 comprising a data imprinting portion A, including an electronic watch circuit, an input control circuit B for the data imprinting portion A, a delay circuit C for determining the time for which the input to the data imprinting portion A is effective, and an illumination drive circuit D cooperating with the input control circuit B to illuminate the external display liquid crystal panel 10.

The input control circuit B comprises switches 13a and 13b for the buttons 13a and 13b of FIG. 1 (the switches for the buttons 12 and 14 being omitted for the purpose of simplicity), an input lock switch 15, AND gates 17 and 18, a NAND gate 19, an OR gate 20, pull-up resistors 38, 39 and 40. The output of the NAND gate 19 is changed from normally "high" to "low" only when both of the switches 13a and 13b are turned on. The output of the OR gate 20 becomes "high" when at least one of the two conditions that the input lock switch 15 is OFF and that the output of the NAND gate 19 is "high" is satisfied, in other words, when at least one of the conditions that the input lock button 15 is not depressed and that at least one of the buttons 13a and 13b is not depressed is satisfied. The AND gates 17 and 18 responsive to closure of the switches 13a and 13b respectively produce outputs of "high" level provided that the output of the OR gate 20 is "high" and the output of the delay circuit C is "high". These outputs are applied as data change-over signals to the data imprinting portion A.

The delay circuit C comprises mono-stable multivibrators 22, 23 and 24, OR gates 21 and 29, AND gates 25 and 26 and inverters 27 and 28. The OR gate 21 receptive of ON/OFF signals from the switches 13a and 13b changes its output from normal "low" to "high" level when at least one of the ON/OFF signals represents ON. Responsive to this change of the output of the OR gate 21, the monostable multivibrators 22 and 24 produce pulses of durations t1 and t2 respectively. The output of the multivibrator 24 is connected to the input of the inverter 27 of which the output is connected to the input of the mono-stable multivibrator 23. In synchronism with the rising edge of the pulse from the multivibrator 24, the multivibrator 23 starts to produce a pulse of duration t3. From the moment at which the OR gate 21 changes to "high" level, a "high" signal is applied to the AND gate 25 for the time t1, and after the time t2 therefrom, a "high" signal is applied to the AND gate 26 for the time t3. The remaining input terminal of the AND gate 25 is connected to the output of the input lock switch 15. The remaining input terminal of the AND gate 26 is connected through the inverter 28 to the output of the input lock switch 15. Therefore, when the input lock switch 15 is OFF, the "high" signal is given to the AND gate 25, and when ON, to the AND gate 26.

In short, the output of the delay circuit C takes either "low" level when all the switches 15, 13a and 13b are open or, "high" level either for the time t1 from the moment at which either or both of the switches 13a and 13b is or are closed; when the input lock switch 15 is OFF, or for the time t3 after the elapse of the time t2 from that moment; and when the input lock switch 15 is ON. Thus, the delay circuit C determines when and how long the outputs of the data setting switches 13a and 13b are placed onto the input lines of the data imprinting portion A.

The functions of the input control circuit B may be summarized in table 1 below:

TABLE 1

| Input Lock Switch 15 | OFF (Input Not Locked) | ON (Input Locked) | |
|---|---|---|---|
| Data Setting Switches 13a & 13b | Both ON | Either ON | Both ON with time lag t2 at most |
| Output of OR gate 20 | High | High | High → Low (within time lag t2) |
| Output of Delay Circuit C | High for t1 | High for t3 after t2 | High For t3 after t2 from when whichever first 13a & 13b is closed |
| Output of AND gate 17 Output of AND gate 18 | High for t1 | Only One Is High for t3 after t2 | Low |

It is to be noted here that the value of time t2 must be longer than a maximum possible range of different changeover timings of the switches 12 to 14 as an equal pressure on each of the buttons 12 to 14 gradually increases at the same speed from button to button. To increase the delay time t2 to a desired value, it is only necessary to increase the number of pairs of a mono-stable multivibrator and an inverter.

Next explanation is given to the illumination drive circuit D for the external display liquid crystal panel 10 cooperating with the input control circuit B.

This illumination drive circuit D comprises an AND gate for producing an output signal of "high" level when both of the outputs of the OR gates 20 and 21 are "high", that is, the input lock switch 15 is OFF, and at least one of the setting switches 13a and 13b is OFF and at leaset one is ON, a frequency divider 31 receptive of the clock pulses from the data imprinting portion A for producing a train of pulses of proper frequency with a duty cycle of 50%, an inverter 32 for producing an inverted signal to the signal produced by ON/OFF of the input lock switch 15, a lamp 36, NPN transistors 33, 34 and 35 for driving the lamp 36, an electrical power source or battery 37 and current limiting resistors 41, 42 and 43.

The operation of this illumination drive circuit D is as follows: (1) When the input lock switch 15 is OFF (the input is not locked), the output of the inverter 32 is "low" so that the NPN transistor 34 is always OFF. Since the output of the OR gate 20 is, on the other hand, "high", when the input switches 13a and 13b are both simultaneously closed, the output of the AND gate 30 becomes "high", thereby the NPN transistor 33 is turned on. Therefore, the lamp 36 is supplied with direct current, giving off light of high intensity.

(2) With the input lock switch 15 turned on (the input locked), because the output of the inverter 32 is "high", the NPN transistor 34 is turned on and off repeatedly when the NPN transistor 35 turns off and on respectively, thereby the lamp 36 is energized with the duty cycle of 50%. Therefore, its light is of low intensity; When either one of the input switches 13a and 13b is then closed, the output of the NAND gate 19 changes to "high", and the output of the OR gate 20 changes to "high". Therefore, the output of the AND gate 30 changes to "high", thereby the lamp 36 is supplied with direct current by the NPN transistor 33, changing its intensity to "high". Conversely when both of the input switches 13a and 13b are closed, the output of the NAND gate 19 remains "low", cutting off the supply of the direct current to the lamp 36, while the alternating current of duty cycle of 50% continues to be supplied to the lamp 36. For note, when the camera is used under water at a deep depth, the input switches 13a and 13b are both turned on by the water pressure. As has been mentioned above, the input lock button 15 when in underwater photography works as a water pressure sensitive switch. The above-described functions are summarized in Table 2 below.

TABLE 2

| | Input Lock Switch 15 | Data Input | | Display Illumination (Lamp 36) | |
|---|---|---|---|---|---|
| | | Single | Double | No Data Input | When Inputting Data |
| In the Air | OFF | 0 (No Time Lag) | 0 (No Time Lag) | No Light | Bright |
| Under Water (Shallow) | ON (By Water Pressure) | 0 (Time Lag Exists) | | Dim | Bright |
| Under Water (Deep) | | | | Dim | Dim |

As the user has set the data imprinting device, when to ascertain whether or not the setting has been effectively performed, he needs only to feel the mobility of the buttons 13a and 13b and to look at the display lamp 36 giving off light of high intensity. Also, whether or not the water pressure has been sensed is possible to know by the display lamp 36 giving off light of low intensity, and it is easy to ascertain what data are set in. Also, with the water pressure above the first threshold level, even in the case where the data input is possible, when to perform the input setting operation, the user has to keep the button 13a or 13b pushed down for a longer time than when the water pressure is lower than that level. The necessity of paying due attention to the inputting operating leads to avoid errors.

Each of the input button switches 12, 13a, 13b and 14 and the input lock button switch 15 may be constructed with a flexible cover of watertight structure and a movable contact member such as a leaf spring or coil spring. It may be otherwise constructed in the form of a momentary switch comprising an electrically conductive rubber patch on the inside surface of the cover member cooperating with a switch pattern on a circuit substrate.

As the data imprinting portion A use may be made of a wide variaty of those known in the art. Also, instead of using the incandescent lamp 36 it is also possible to use an LED.

According to the present invention, the user can ascertain at a glance whether or not the data input is right, and, at the same time, can know what data have been imprinted. The data imprinting device of the invention is, therefore, most suited for cameras which are usable even under water.

What is claimed is:

1. A data imprinting device for a camera usable for underwater photography comprising:
    (a) data imprinting means;
    (b) actuating means for setting data of said data imprinting means;
    (c) display means for displaying the data of said data imprinting means;
    (d) illuminating means for illuminating said display means; and
    (e) detection means for detecting that the camera is under water and actuating the illumination means to automatically operate.

2. A device according to claim 1, wherein said detection means includes a water pressure detector.

3. A data imprinting device for a camera usable for underwater photography comprising:
    (a) data imprinting means;
    (b) actuating means for setting data of said data imprinting means;
    (c) detecting means for detecting that the camera is under water;
    (d) display means for displaying the data of said data imprinting means;
    (e) illuminating means for illuminating said display means; and
    (f) control means for controlling the illumination means to illuminate differently between when the camera is detected to be under water by the detection means and the actuating means operates, and when the camera is detected to be underwater by the detection means but the actuating means does not operate.

4. A device according to claim 3, wherein the detection means includes a water pressure detector.

5. A device according to claim 3, wherein said control means includes a frequency divider by which the illuminating state is differentiated.

6. A device according to claim 3, wherein the control means includes intensification means for intensifying the illumination of the illuminating means more strongly when the camera is detected to be under water by the detection means and the actuating means operates than when the camera is detected to be under water but the actuating means does not operate.

* * * * *